U S011419452B2

(12) United States Patent
Fransen (10) Patent No.: US 11,419,452 B2
(45) Date of Patent: Aug. 23, 2022

(54) SANDWICH PRESS HINGE

(71) Applicant: BREVILLE PTY LIMITED, Alexandria (AU)

(72) Inventor: Adam Fransen, Leichhardt (AU)

(73) Assignee: BREVILLE PTY LIMITED, Alexandria (AU)

( * ) Notice: Subject to any disclaimer, the term of this patent is extended or adjusted under 35 U.S.C. 154(b) by 692 days.

(21) Appl. No.: 16/336,321

(22) PCT Filed: Sep. 7, 2017

(86) PCT No.: PCT/AU2017/000189
§ 371 (c)(1),
(2) Date: Mar. 25, 2019

(87) PCT Pub. No.: WO2018/064704
PCT Pub. Date: Apr. 12, 2018

(65) Prior Publication Data
US 2019/0274475 A1    Sep. 12, 2019

(30) Foreign Application Priority Data

Oct. 4, 2016   (AU) .............................. 2016904014

(51) Int. Cl.
*A47J 37/06*    (2006.01)

(52) U.S. Cl.
CPC .... *A47J 37/0611* (2013.01); *A47J 2037/0617* (2013.01)

(58) Field of Classification Search
CPC ........... A47J 37/0611; A47J 2037/0617; E05F 1/008; E05F 1/1058; E05F 1/1075
USPC ............. 99/377, 379, 372; 16/306, 304, 308
See application file for complete search history.

(56) References Cited

U.S. PATENT DOCUMENTS

| 4,987,827 A  * | 1/1991  | Marquez ............... A47J 37/0611 |
| | | 99/331 |
| 5,996,132 A  * | 12/1999 | Sorimachi ................. E05F 3/20 |
| | | 4/236 |
| 2010/0319550 A1* | 12/2010 | Wu ....................... A47J 37/0611 |
| | | 99/380 |

(Continued)

FOREIGN PATENT DOCUMENTS

| EP | 1400195 A1 | 3/2004 | |
| EP | 1669013 A1 | 6/2006 | |
| FR | 2814055 A1 * | 3/2002 | .............. A47J 36/10 |

(Continued)

OTHER PUBLICATIONS

International Search Report and Written Opinion for PCT/AU2017/000189, dated Nov. 2, 2017.

(Continued)

*Primary Examiner* — Reginald Alexander
(74) *Attorney, Agent, or Firm* — Moser Taboada (57) ABSTRACT

A cooking appliance such as a grill or a sandwich press that includes an upper housing and a lower housing assembly. The housing assemblies are connected by hinge assemblies that provide for angular movement of the upper housing between a first position which is adjacent the housing, and a second position at which the upper housing is spaced upwardly of the lower housing. Each hinge assembly includes a spring that applies a torque urging the upper housing assembly to the second position.

15 Claims, 12 Drawing Sheets

(56) References Cited

U.S. PATENT DOCUMENTS

2015/0337579 A1* 11/2015 Jacobs ................. G06F 1/1681
361/679.55
2016/0015212 A1* 1/2016 Yang .................... A47J 37/0611
99/379

FOREIGN PATENT DOCUMENTS

FR           2866539 A1    8/2005
JP           H0722542 A    1/1995

OTHER PUBLICATIONS

Extended European Search Report issued in EP 17857683.1, dated Mar. 26, 2020.

\* cited by examiner

FIG. 15

SANDWICH PRESS HINGE

FIELD

The invention pertains to a grill or sandwich press and more particularly to a grill or sandwich press having an adjustable pressing force.

BACKGROUND

Grills and sandwich presses have upper and lower cooking plates. Each plate is retained by a housing. The upper and lower housings are interconnected by a hinge. A disadvantage of the grills and presses is that the pressing force on the food between the plates is based on the weight and position of the upper housing and its cooking plate, with the further disadvantage that the force imposed by the upper housing is sometimes excessive or inadequate for a particular food or cooking process and cannot be user adjusted.

In some cooking circumstances, the effective weight of the upper housing of the appliance is excessive. This has the disadvantage that there is the potential to distort the shape or appearance of the food. For example, a grilled cheese sandwich will leak more cheese onto the lower cooking plate than is desirable.

OBJECT

The object of the present invention is to overcome or substantially ameliorate the above disadvantage.

SUMMARY

There is disclosed herein a cooking appliance including:
an upper housing assembly;
a lower housing assembly;
a hinge assembly coupling the housing assemblies for angular movement about a generally horizontal axis, the angular movement providing for movement the upper housing assembly between a first position at which the housing assemblies are adjacent and a second position at which upper housing is spaced upwardly from the first position, providing for the location of a food product between the housing assemblies for the purposes of cooking the food product, the hinge assembly including,
a hollow portion attached to a first one of the housing assemblies and through which the axis passes,
a hollow housing located within the hollow portion and through which the axis passes,
a spring located in the hollow housing,
a part attached to a second one of the housing assemblies and through which the axis passes, and wherein
the spring is operatively associated with the hollow portion and the part to urge the upper housing to the second position thereof.

Preferably, the spring has a first end portion engaged with the hollow housing, and a second end portion engaged with the part, with the hollow housing being fixed to the first hinge assembly so that there is no relative movement between the hollow housing and first hinge assembly.

Preferably, the spring is a coil spring through which the axis passes, so that coils of the spring surround said axis.

Preferably, the hollow housing includes a housing sleeve, a post located in the sleeve so that there is a cavity between the post and sleeve, with the spring being located in the cavity.

Preferably, the sleeve has a plurality of ribs and/or grooves, and the hollow portion a plurality of ribs and/or grooves that are engaged with the ribs and/or grooves of the hollow housing so that the hollow housing is engaged with the hollow portion to prevent relative movement therebetween.

Preferably, the hollow housing includes a collar engaged with the hollow portion and the part to sealingly connect the hollow portion with the part.

Preferably, the part slidably engages the collar.

Preferably, said spring applies a torque urging the first housing assembly to the second position.

Preferably, said spring is configured so that the torque diminishes as the first housing assembly moves from the first position towards the second position.

Preferably, the first housing assembly is the upper housing assembly, and the second housing assembly is the lower housing assembly.

Preferably, the hinge assembly includes a further sleeve, the further sleeve being located between the spring and the housing sleeve.

BRIEF DESCRIPTION OF THE DRAWINGS

Preferred forms of the present invention will now be described by way of example with reference to accompanying drawings wherein:

FIG. 3 is an exploded view of a hinge assembly in top plan view;

DETAILED DESCRIPTION OF THE PREFERRED EMBODIMENTS

Figure 1:
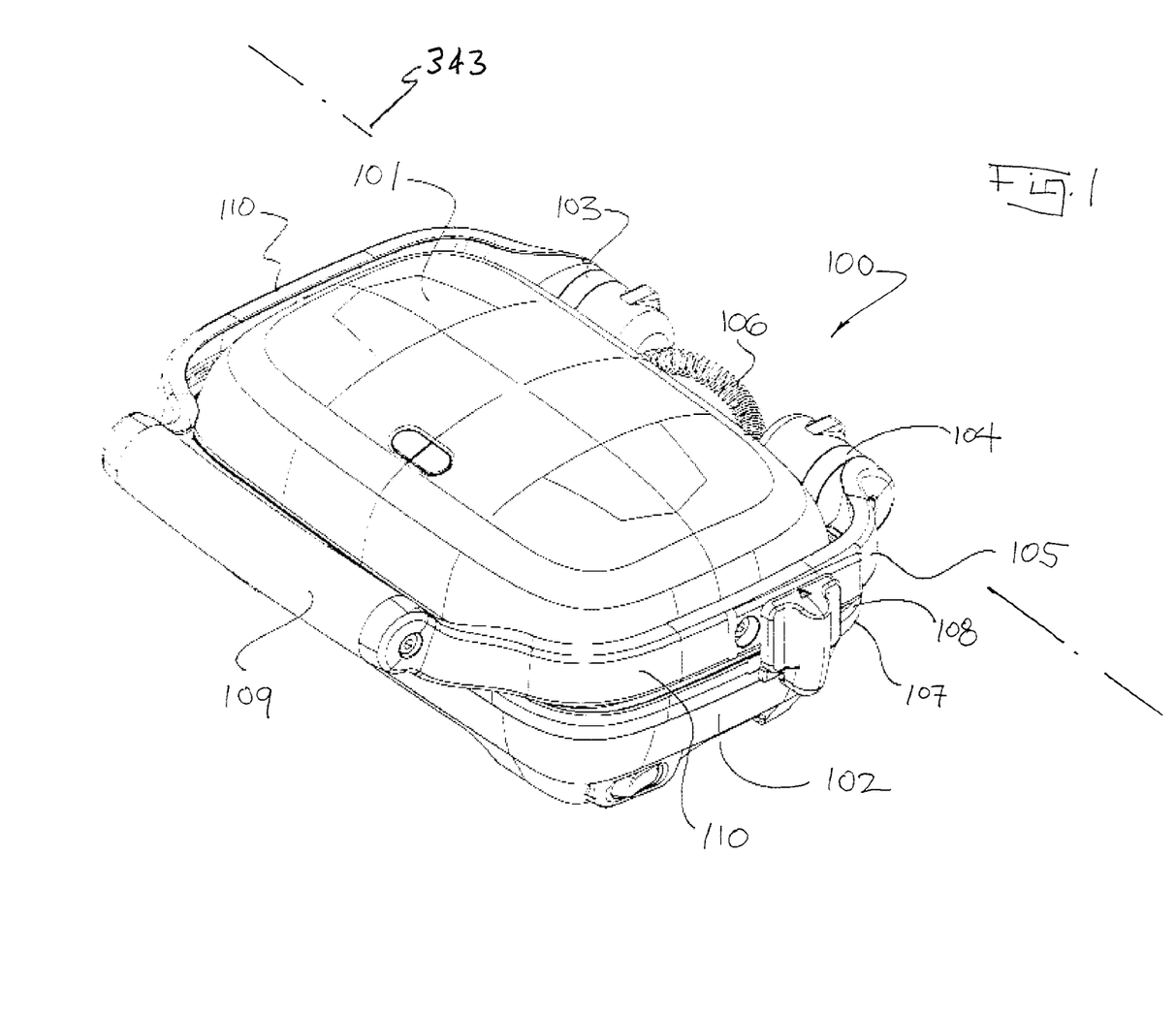
FIG. 1 is a perspective view of a cooking appliance having upper and lower housings.

As shown in FIG. 1, an electrical food cooking appliance 100, such as a grill or sandwich press, has an upper housing (assembly) 101 and a lower housing (assembly) 102 each having cooking plates 107, 108 that are brought together, face to face. The upper 101 and lower housings 102 are interconnected by one or more hinge assemblies 103, 104. A handle 105 controls the movement of the upper housing 101. The handle 105 has a grip 109 and hinged side arms 110. A coil spring or other protective flexible housing 106 is used to protect the electrical cord that is required to power the heating element contained in the upper housing 101. The pressing force on food in the appliance 100 is conventionally governed by the weight of the upper housing 101 (including the handle 105 or otherwise) and the location of the upper housing 101. In general, the effective pressing force of the upper housing is reduced in accordance with a degree to which the upper housing 101 is opened. The upper housing 101 pivots about the axis 343 provided by the hinge assemblies 103, 104.

The example shown in FIG. 1 utilises a pair of hinge assemblies 103, 104 provided as a left-right mirror image pair. Each hinge assembly 103, 104 has within it a spring 207 or bias element such as a tension spring 207. The hinge assemblies 103 and 104 provide for angular movement between the housings 101 and 102 about axis 343, with the upper housing 101 being movable between a first position at which the housing 101 is adjacent the housing 102, and a second position at which the housing 101 is spaced upwardly from the housing 102. One end of each spring 107 is fixed and the other end is indirectly connected to the upper housing 101. The springs 207 exert a torque or opening force on the upper housing 101 that decreases as the upper housing 101 is opened. The spring 207 urges the housing 101 to the second position thereof, but in this embodiment applies insufficient torque to move the housing 101 from the closed position. However, the spring 107, by urging the housing 101 to the open position, at least aids a user in moving the housing 101 toward the open position by at least partly supporting the weight of the housing 101.

Although a left-right mirror image pair is preferred for reducing racking and improving levelness of the upper plate 101, it is envisaged an alternate embodiment would utilize a single biased hinge assembly 103, 104 on either the left or right side. In this alternate embodiment the non-biased hinge assembly 103, 104 is slaved to movement of the biased hinge assembly 103, 104 as translated by the interjoining side arms 270, 271 and handle 105.

Figure 2:
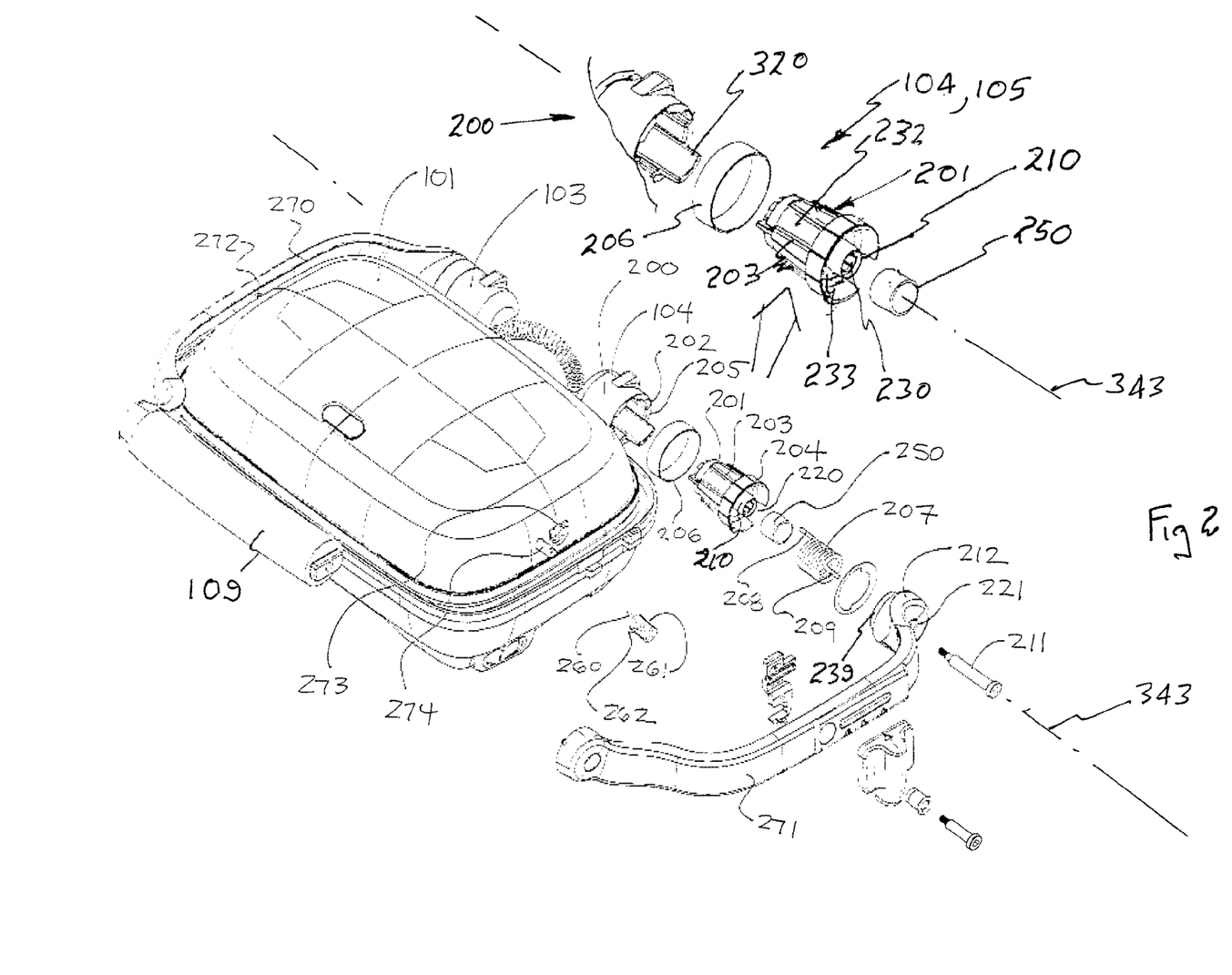
FIG. 2 is an exploded perspective view of a hinge assembly.

An exploded view of a hinge assembly 104 is shown in FIG. 2. Each hinge assembly 103, 104 has a fixed and non-rotating hollow barrel portion 200. The barrel portion 200 receives a non-rotating hollow hinge housing 201. The hinge housing 201 is preferably made from a temperature resistant material such as PPS that also provides thermal insulation. The housing 201 and the barrel portion 200 interconnect through an arrangement of longitudinal grooves and cooperating ribs 202, 203. In this example, the longitudinal ribs 203 are on the housing 201. The housing 201 has an upper collar 204 that abuts the rim 205 of the barrel 200. A decorative ring 206 may be used to conceal the collar 204. The ribs 202, 203 prevent relative movement between the barrel portion 200 and housing 201.

The hinge housing 201 contains the spring 207. In this example, a torsional tension spring 207 is formed as an axial coil. The coil, and therefore spring 207, has axially extending opposite ends 208, 209. The spring 207 fits around and is stabilised by the centre post 210 of the housing 201. The centre post 210 has a central longitudinal bore 230 for receiving the threaded end of the fastener 211. An anti-friction sleeve 250 may be interposed between the centre post 210 and the inside diameter of the spring 207. The sleeve 250 is fabricated as a cylinder of heat resistant low friction polymer, such as polyoxymethylene (POM). The housing 201 includes an outer sleeve 232 that surrounds the post 210, with a cavity 233 between the sleeve 232 and post 210. The spring 207 is located in the cavity 233. The axis 343 passes through the barrel portion 200, spring 207 and housing 201.

Figure 16:
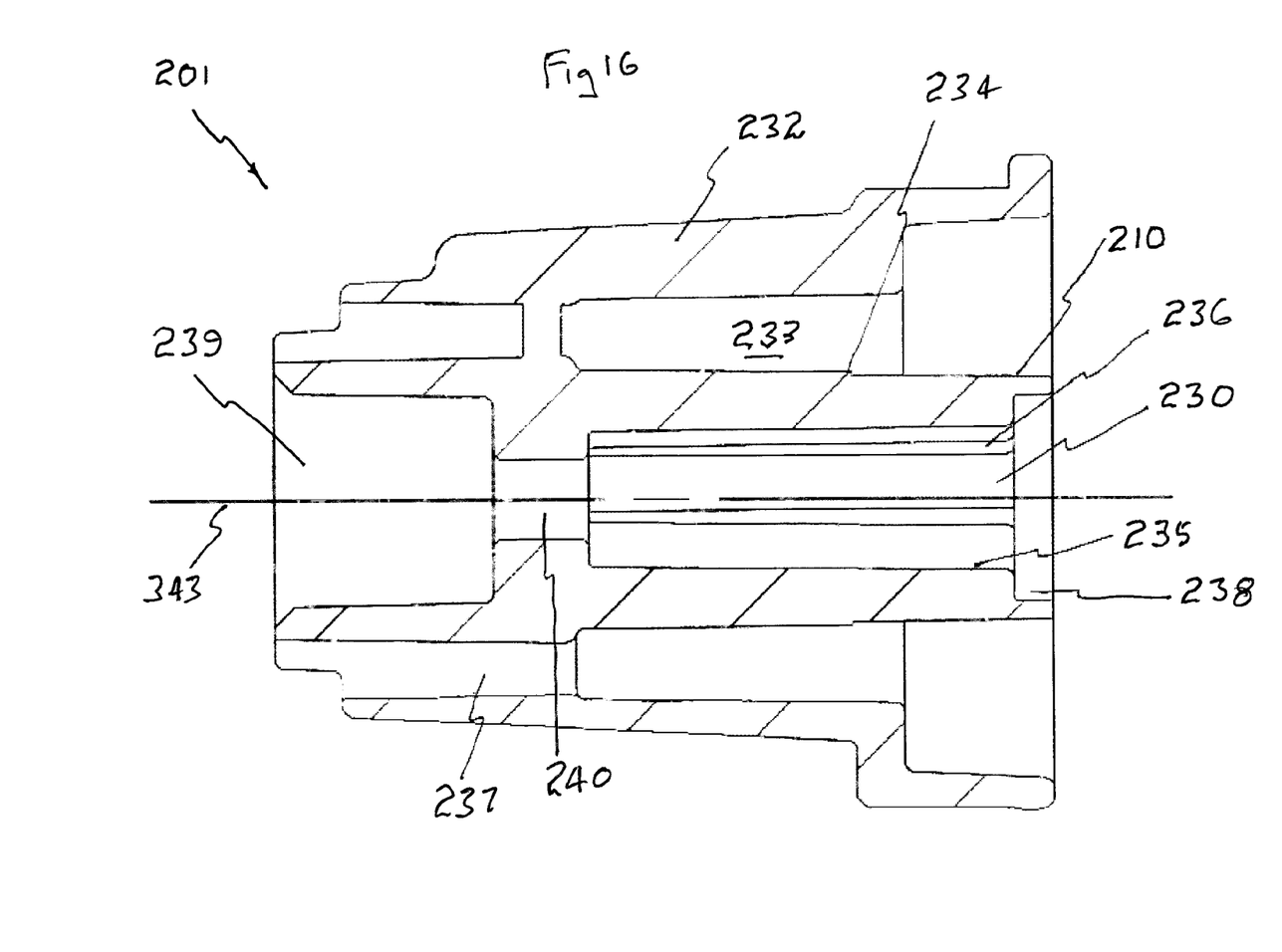
FIG. 16 is a schematic sectioned side elevation of a hinge housing employed in the cooking appliance of FIG. 1.

With reference to FIG. 16, the housing 201 includes an annular lip 234 on the post 210, that engages the sleeve 250, to limit movement of the sleeve into the cavity 233. The internal surface 235 of the post 230, that surrounds the bore 230, has a plurality of longitudinally extending ribs 236 that engage the threaded fastener 211 to secure the threaded fastener 211 to the housing 201. The housing 201 also has a passage 237 that receives the end 208 of the spring 207, to fix the end 208 relative to the housing 201. The housing 201 also has an annular recess 238 to receive the boss 239 of the handle end 212. The housing 201 also includes a recess 239 that receives an internal boss 239 of the barrel portion 200. The recess 238 is connected to the board 230 by a passage 240 into which the threaded fastener 211 may extend.

As will be explained, one end 208 of the torsional spring 207 engages the non-rotating hinge housing 201. The opposite end 209 engages the handle end 212. Accordingly, as the handle 105 and upper housing 101 rotate about the hinge 103, 104, the spring 207 extends or unwinds, imposing an ever greater tension or opening force as the upper housing 101 closes.

Figure 2A:
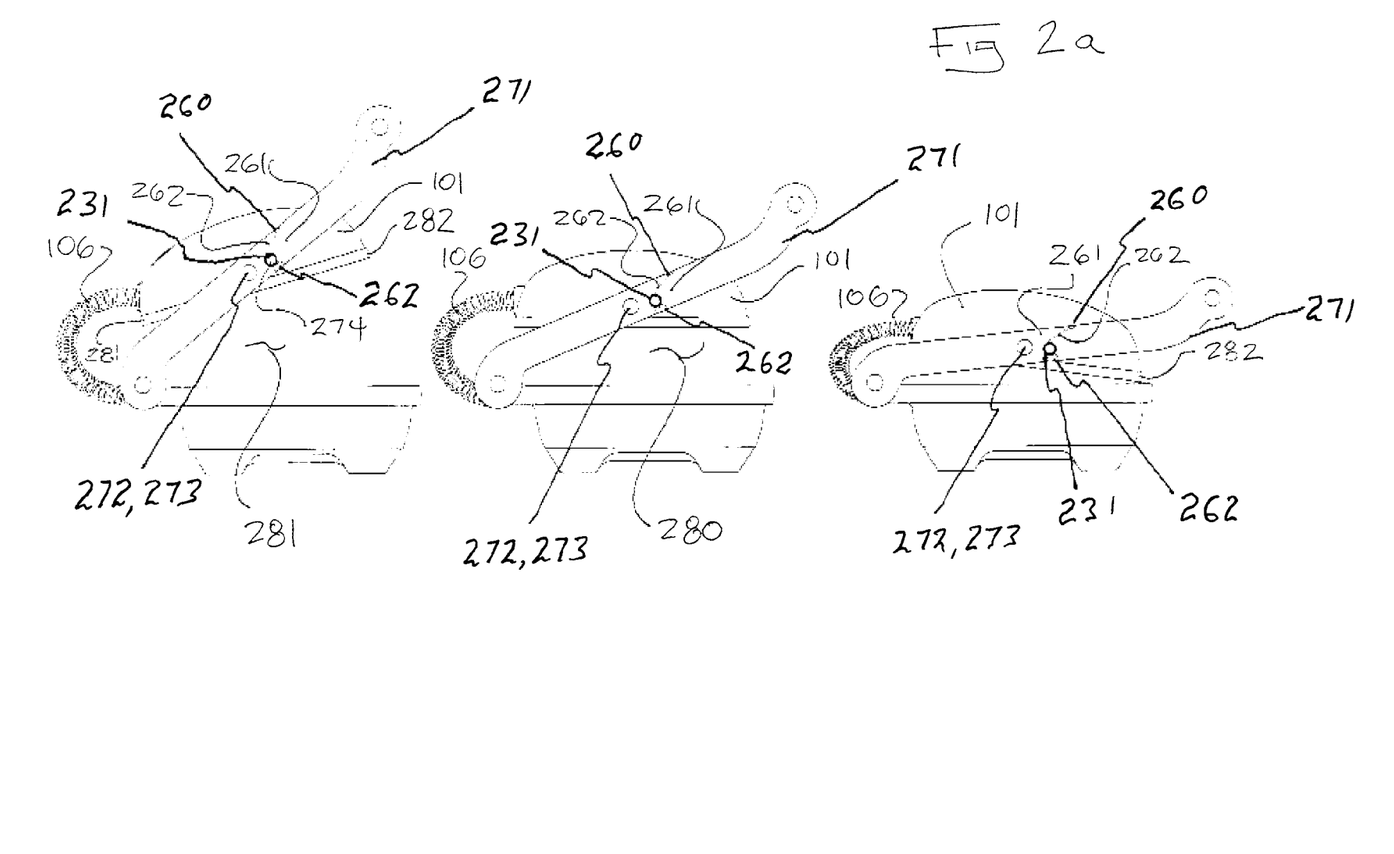
FIG. 2a illustrates, in side view, a levelling spring.

As shown in the example of FIG. 2a, a spring 261 such as a torsion or leaf spring 261 is interposed between one or both lateral arms 270, 271 and the upper housing 101. The upper housing 101 has pivot points 272, 273. The upper housing 101 is engaged by the arms 270, 271 via the pivoting points 272, 273. In the example of FIGS. 2 and 3, the spring 261, is retained by a post 274 that extends laterally from one or both sides of the upper housing 101. The post 274 is received by the internal bore 231 of the spring 261 and allows one end 260 of the spring 261 to engage the upper housing 101. The other end of the spring 261 bears on or is received by the adjacent arm 270, 271. With reference to FIG. 2A, the spring 261 exerts a force on the upper housing 101 that tends to rotate the upper housing 106 in a way that counteracts the forces imposed by the protective housing 106.

The spring 261 is calibrated so that the upper housing 101 and the lower housing 102 are approximately parallel when the upper and lower cooking plates 107, 108 are separated by a distance 280 that is representative of a typical cooking process such as the thickness of a two slice sandwich. When the upper and lower cooking plates 107, 108 are further apart, distance 281, the front edge 282 will be higher than the lower edge 281 of the upper cooking plate 106. When the separation is less than the point where the plates are parallel, position 282, the front edge 282 will be lower than the rear edge 281.

As shown in FIG. 3, the ribs 300 formed on the exterior of the housing 201 may be tapered so as to cooperate and fit tightly with tapered grooves 301 formed around the interior bore 230 of the barrel portion 200. The barrel portion 200 may also have a tongue 302 that extends beyond the rim 205. In this example, the tongue 302 is moulded integrally with the barrel portion 200 which is itself part of the upper heating plate die casting 303. The tongue 302 engages a longitudinal slot formed on an exterior of the housing 201. This slot may extend so as to form a gap 220 (see FIG. 2). The combination of ribs 300 and tongue 302 provide for a rigid, stable torsional interconnection between the housing 201 and the barrel portion 200.

The barrel portion 200 has a floor 304 with an axial opening 305 for receiving the inner or spring end 208 of the spring 207. The outer or handle end 209 of the spring 207 is received by an axial receptacle or bore 310 formed in the hinge end 311 of the handle arm end 212.

The hinge end 311 of the arm 330 may also have a cylindrical or slightly tapered plug 312 that is received within the spring 207 and acts as a guide for the spring 207. An anti-friction washer 313 is interposed between the sealing face 314 of the arm end 311 and its mating surface, the front face 315 of the barrel portion 200. The hinge screw 320 inserts from the hinge end of the arm 311. The head of the fastener is received by recess 221 (see FIG. 2). The fastener 320 extends through the arm end 311, the washer 313, the spring 207 and the housing 201. The threaded end of the fastener 320 is received by a threaded bore 350 formed centrally with the barrel 201. The fastener 320 has a shoulder 321 that abuts the upper surface of the floor 304 of the housing 300. Because the shoulder 321 stops the advancement of the fastener 320, the length of the fastener's shaft 322 can be used to accurately control the location of the face 314 of the handle's arm 270, 271 relative to the front face 315 of the housing 201. By controlling this distance, the compression forces acting on the anti-friction washer 313 can be accurately limited, resulting in lower friction when operating the handle.

In the example of FIG. 3, the total handle assembly has two arms 330, 331. Each arm 330, 331 has a hinge end 311 that conforms to the outer surface of the rear corner of the upper housing 101. The each arm 330, 331 conforms to the shape of the plate 303, but departs from the shape of the plate 303 at a forward location 332 where the arm 330, 331 extends away from the plate 303 to form a grip attachment portion 333. A grip 334 for example a curved grip is interposed between the two arms.

The hinge end 311 may also have a projecting rib or bumper 340 that is adapted to make contact with the tongue 302. The tongue 302 interferes with the rotational movement of the bumper 340 and therefore acts as a limit of travel of the handle.

Figure 4:
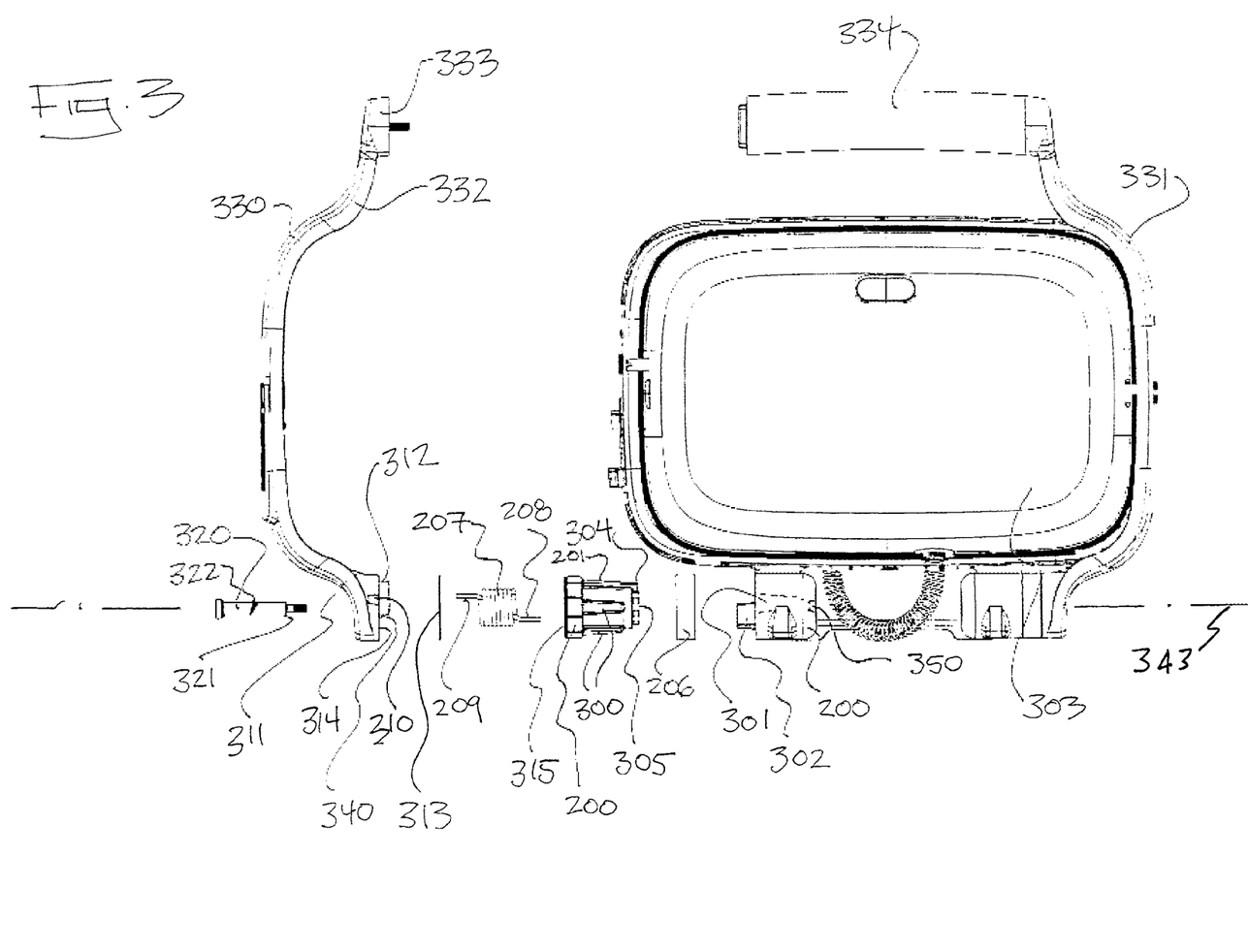
FIG. 4 is an inverted perspective view of a lower cooking plate.

As shown in FIG. 4, the lower cooking plate casting 400 provides a number of integral features. The casting 400 has a peripheral rim 402 that defines the extent or dimensions of the lower cooking surface 401. The underside has an integral elevated track 403 for locating a heating element. The casting provides integral stand-offs 404 and the integral hinge barrels 405, 406. It is an advantage to limit the amount of heat migrating from the heating elements to the spring 207. Because the spring 207 is within the barrel 405, 406, limiting heat transfer to the barrels is also an advantage. Thus, it is an advantage to remove material from the area that interconnects the barrels 405, 406 with the remainder of the casting 400. To this end, spaced apart struts 407, 408 are used to interconnect the barrels 405, 406 with the remainder of the casting 405. This effectively creates a void 409 in the area where the barrels 405, 406 connects to the remainder of the casting 405. The gap between the struts 407, 408 admits air into the void 409 providing high surface area and therefore better cooling and insulation, relative to the barrels 405, 406.

Figure 5:
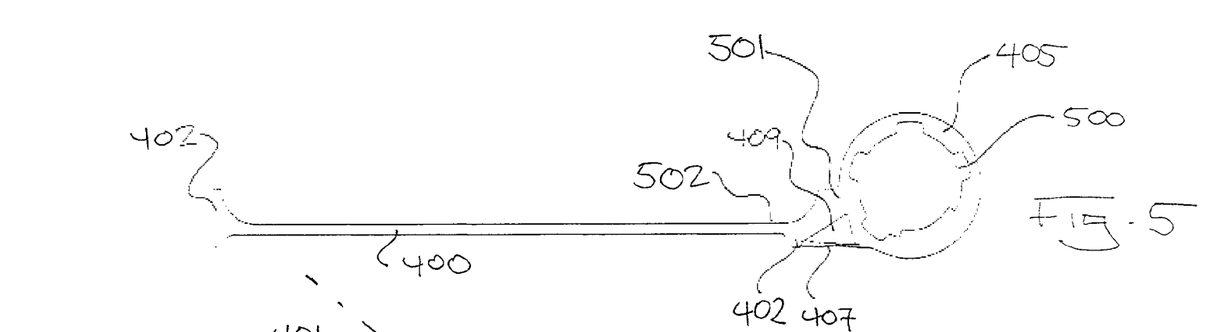
FIG. 5 is a side elevation, in cross-section, of a lower cooking plate die-casting.

As shown in FIG. 5, the integral casting 400 includes the longitudinal grooves 500 on the inner wall of the barrels 405, 406. The void 409 in the area of the joining of the barrels 405, 406 and the remainder of casting 400 is seen as being defined by an air space or deliberate increase of surface area in the area 501 where the barrels 405, 406 is closest to the rim 402 or proximal cooking surface 502.

Figure 6:
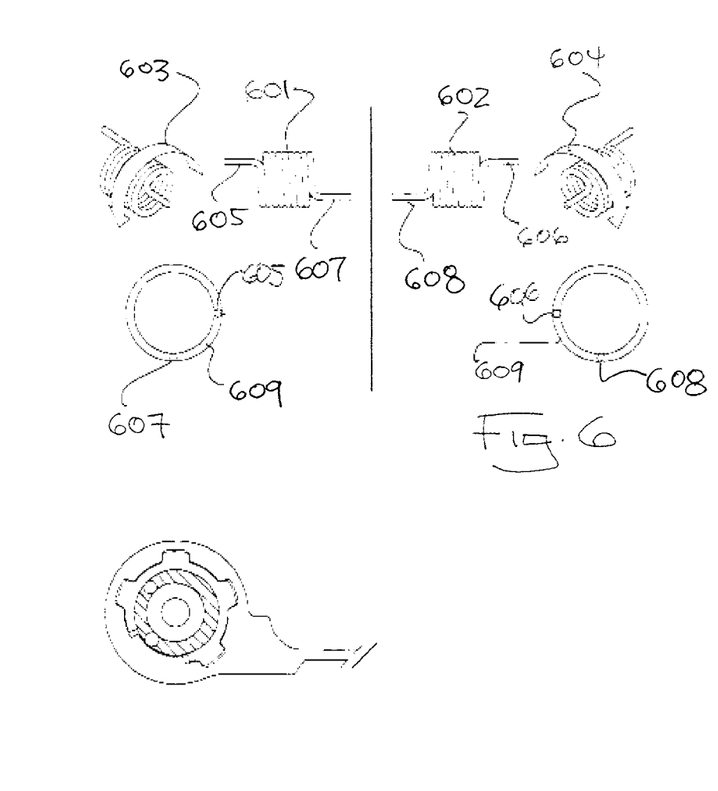
FIG. 6 are a number of diagrams that illustrate the handedness of a coil spring.

FIG. 6 illustrates that the left and right springs 207, 601, 602 are mirror images of one another and have different coil handedness 603, 604. The possibility exists that in an assembly or repair environment, left and right springs 601, 602 could be inadvertently confused for one another. To make it more obvious that assembly is being attempted with the wrong spring, the axially extending handle end 605, 606 is radially displaced by or out of phase with the hinge end 607, 608 by 90 degrees 609. To prevent inadvertent interchange, each has a different direction of displacement. For the left spring 601, there are seven and one quarter turns between the handle end and the hinge end extensions 605, 607. This means that the hinge end 607 is 90° ahead of the handle end 605 for the right hand screw 602 the handle end 606 is 90° behind.

Figure 7:
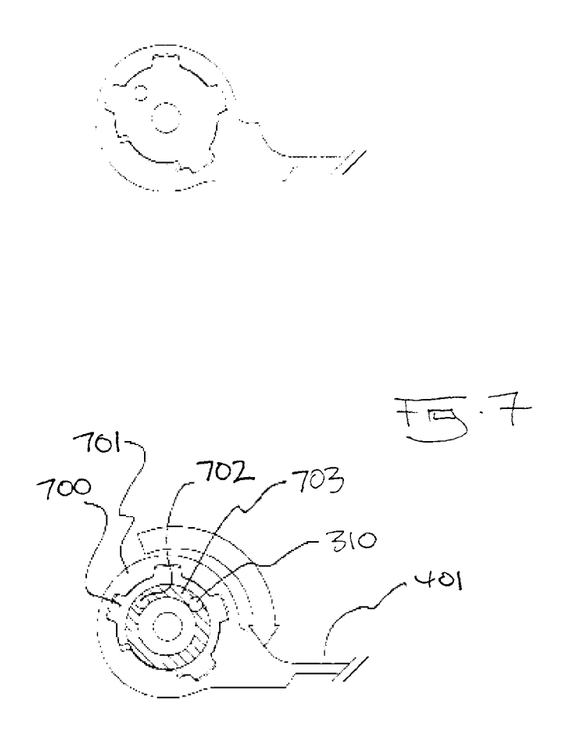
FIG. 7 is a selective cross-section illustrating the orientation between openings for a torsion spring according to FIG. 6.

As shown in FIG. 7 the holder 700 is contained within the barrel 701. An opening 702 in the floor 703 of the holder 700 receives the hinge end 607, 608 of a spring 601, 602. Unless the handle end 605, 608 is in alignment with the opening 310 in the hinge end 311 of the handle 212, the axially aligned extensions 605, 607 and 606, 608 do not engage both holes 702, 310. Thus, the assembler can be made instantly aware that a spring of different handedness is required.

Figure 8:
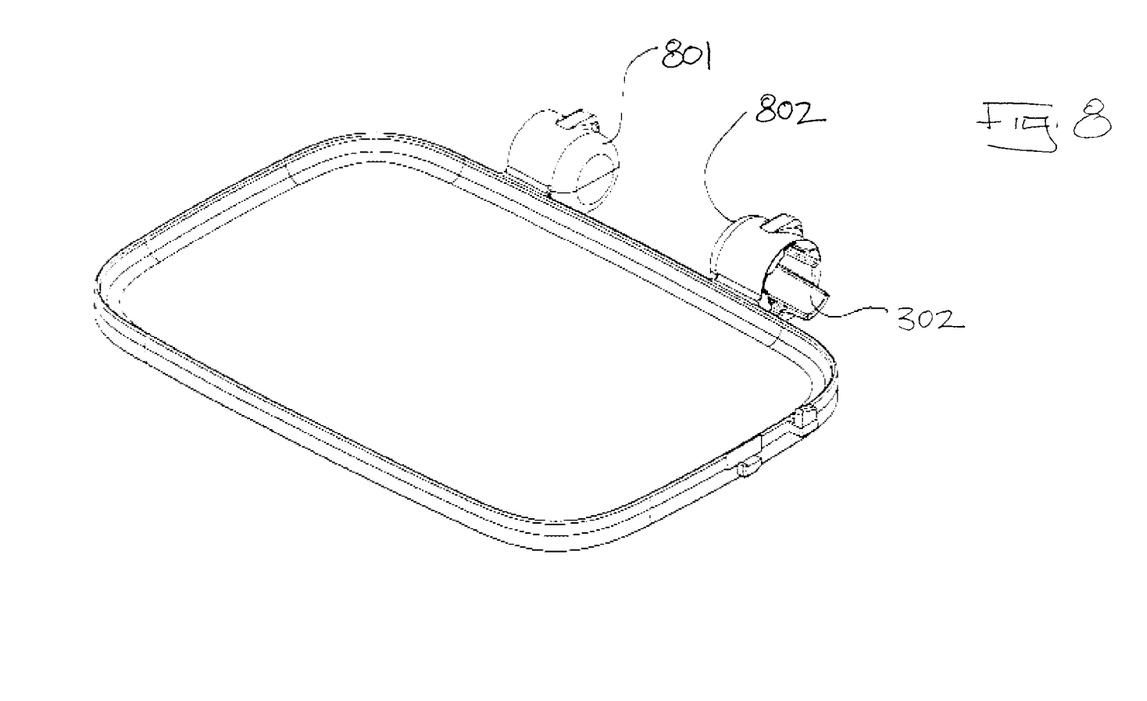
FIG. 8 is a top perspective view of a lower cooking plate.

As shown in FIG. 8, the left and right barrels 801, 802 are mirror images of one another. In order to maintain the phase or displacement relationships between the holes 702, 310 (see FIG. 7) it is preferred that mirror image left and right hinge housings 300 be provided.

Figure 9:
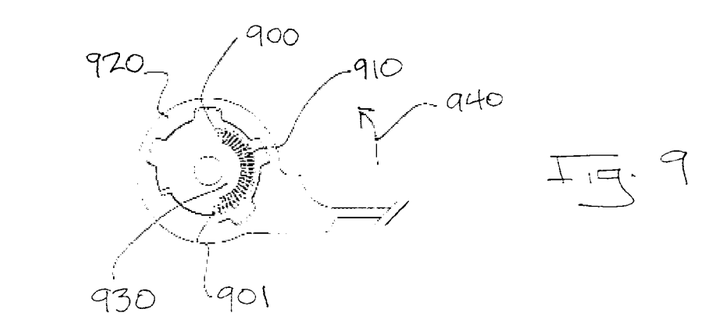
FIG. 9 is a cross-section schematic view of an embodiment of an alternate adjustable tension spring.
Figure 10:
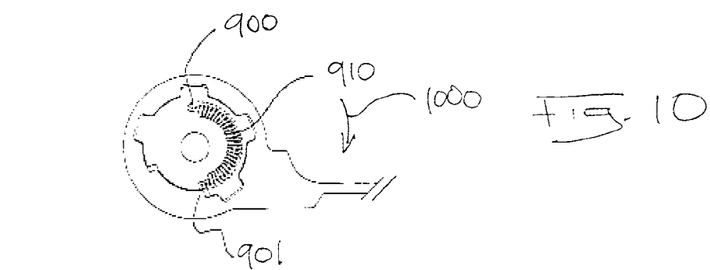
FIG. 10 is a cross-sectional schematic view of an embodiment of an alternate adjustable tension spring.
Figure 11:
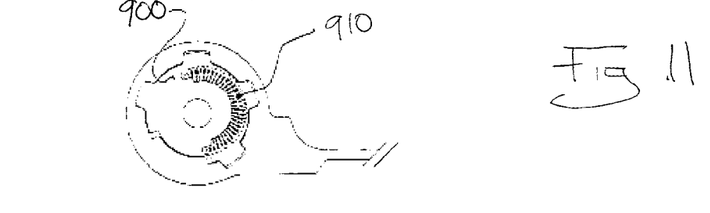
FIG. 11 is a cross-sectional schematic view of an embodiment of an alternate adjustable tension spring.

In the aforementioned examples, the spring is not user adjustable. The spring constant of the spring is engineered to provide a useful range of pressing force over a useful range of motion of the upper housing. However, in some embodiments, the value of the pressing force at any given position of the upper housing may also be user adjusted. When more pressing force is required, the spring within each barrel may be tensioned or pre-tensioned to create that increase. Tensioning the internal spring is accomplished (independently of the movement of the handle) by increasing the angle between the handle extension 605, 606 and the hinge extension 607, 608 of a given spring 601, 602. In the previous examples, one end of each spring is essentially fixed while the other end rotates in an arc of motion defined by the movement of the handle. In the examples of FIGS. 9 to 11, the hinge end of the spring is provided with a user adjustable range of motion. The spring may be adjusted when the upper housing is in any position. Adjustment effectively increases (or decreases) the spring constant and the pressing force throughout the range of motion of the handle.

The example of FIG. 9 provides a simplified axial view of the inside of the barrel 920. A coil spring is bent or wound around the central post 930 of the hinge housing 201. One end 901 of the spring 910 is attached to a rotating arm of the handle. The other end 900 is attached to a rotating element. The rotating element is driven by a knob, as will be explained. With respect to FIGS. 9 and 10, it is shown that adjusting the hinge end 900 away from the handle end 901 (for any handle position) elongates the spring 910 and thereby increases the tension in the spring and reduces the pressing force 1000. In this same handle position, further increasing the displacement of the hinge end 900 further lengthens the spring 910 and creates and even smaller pressing force over the entire range of motion of the handle and upper housing 101. Conversely, reducing the effective distance between hinge end 901 and the handle end 900 has the opposite effect, increasing the effective weight of the upper housing.

Figure 12:
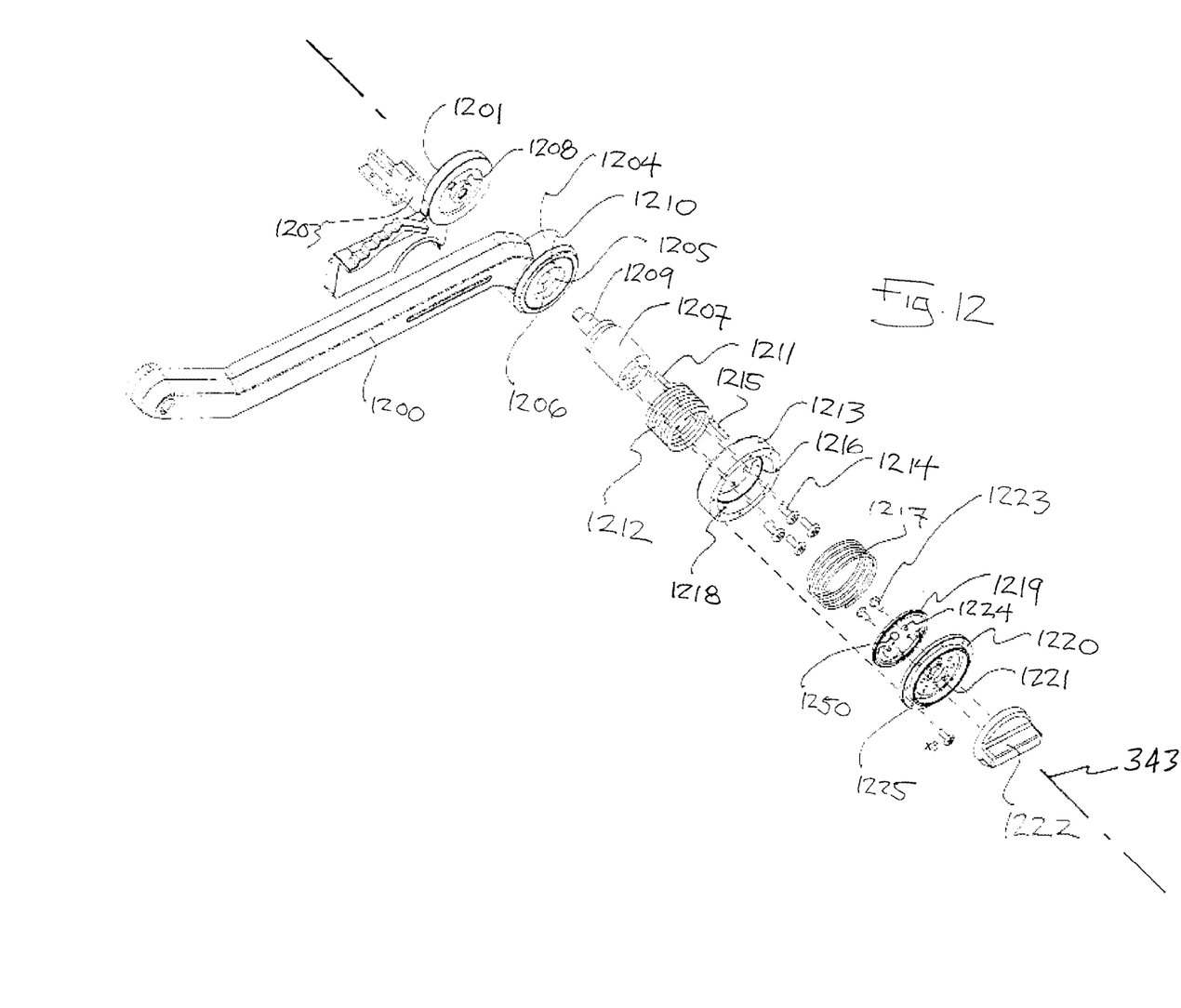
FIG. 12 is an exploded perspective view of the second embodiment of an adjustable hinge spring.

Another embodiment of an adjustable force hinge mechanism is shown in FIG. 12. By way of example, the right arm of the handle assembly 1200 is retained against a fixed hinge plate 1201 that is either fixed to or diecast into the remainder of the lower cooking plate 1203. The hinge end 1204 of the arm has a pivot recess 1205 and central through opening 1206 for receiving a shaft 1207 that passes through the arm and engages a locating opening 1208 in the hinge plate 1201. The shaft 1207 has a stepped stub 1209 that guides the motion of the hinge end 1204 and centres the shaft 1207 with respect to the opening 1208. The hinge end 1204 of the arm has an opening 1210 for receiving the hinge end axial extension 1211 of the coil torsion spring 1212. The spring fits over and is stabilised by the outside diameter of the shaft 1207.

A collar 1213 is affixed to the distal end of the shaft 1207 by one or more fasteners 1214. The collar 1213 locates the spring 12 axially but does not interfere with the movement of the axially adjustment end 1215. The collar 1213 has a slot or opening 1216 that allows the adjustment end 1215 to have a range of radial motion. A compression spring 1217 is received within the sidewalls 1218 of the collar 1213. The compression spring 1217 urges an adjustment plate 1219 against the fixed cover plate 1220. The cover plate 1220 has a pair of arcuate slots 1221 that allow the adjustment plate 1219 to be connected to the knob 1222 by (for example) a pair of axial fasteners 1223. This arrangement allows the adjustment plate 1219 to move both radially and axially with respect to the cover plate 1220. The adjustment plate has an array of axial fingers 1224 that engage and disengage from cooperating openings 1225 formed around a diameter of the cover plate 1220 thus, the adjustment plate 1219 and cover plate 1220 form a clutch. By pressing the knob 1222 against the force of the spring 1217, the adjustment plate 1219 can be disengaged from the cover plate 1220. Rotating the knob 1222 when it is pressed in causes a change in the displacement between the spring ends 1211, 1215. The adjustment to the spring tension is captured when the adjustment plate 1219 and cover plate 1220 are re-connected. In preferred embodiments, the adjustment end 1215 is affixed to an opening 1250 in the adjustment plate 1219. Because there are more spaced apart clutch openings 1225 in the cover plate than fingers 1224, the adjustment plate can assume a number of stable positions relative to the fixed cover plate 1220. Each position defines an extent of displacement between the spring ends 1211, 1215. Moving the knob in one direction increases the pressing force and moving the knob 1222 in the opposite direction reduces the pressing force.

Figure 13:
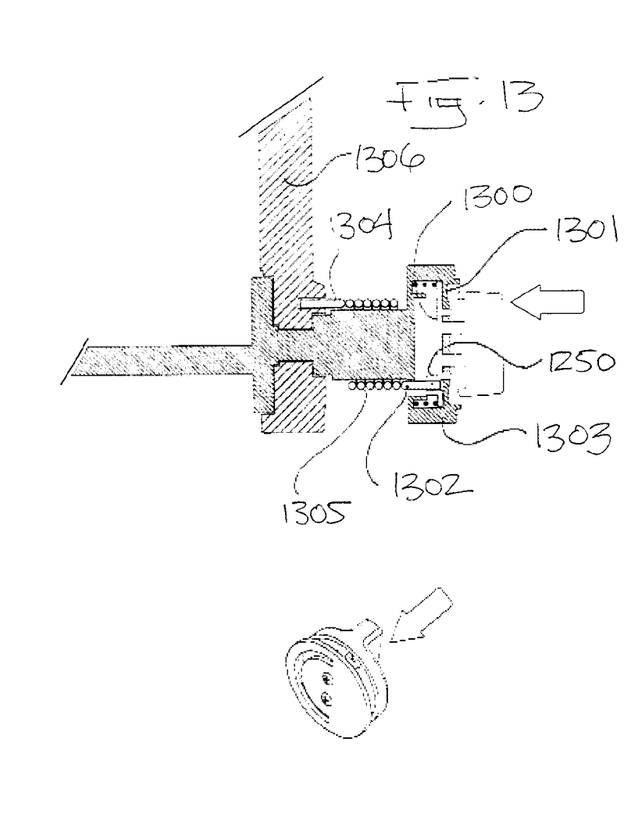
FIG. 13 is a perspective view of an adjustment mechanism when engaged.

As shown in FIG. 13, when the adjustment plate 1300 is engaged with the cover 1301 the adjustment end 1302 becomes fixed relative to the cover 1303. The hinge end 1304 of the torsion spring 1305 is free to rotate with the arm 1306 and the handle.

Figure 14:
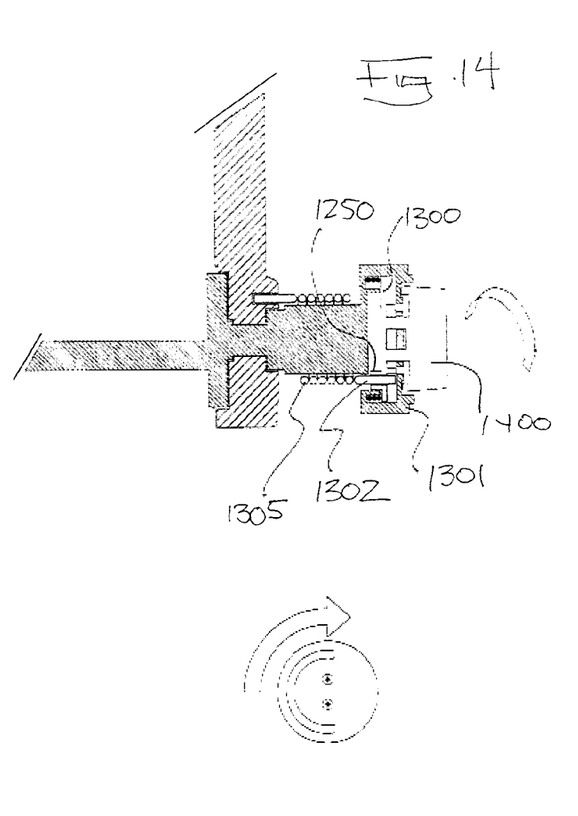
FIG. 14 is a perspective view of an adjustment mechanism, when disengaged.

As shown in FIG. 14 when the knob 1400 is pushed in, it disengages the adjustment plate 1300 from the cover plate 1301. This allows the knob 1400 to be rotated independently of the cover while still mechanically attached to the adjustment end 1302 of the spring 1305.

Figure 15:
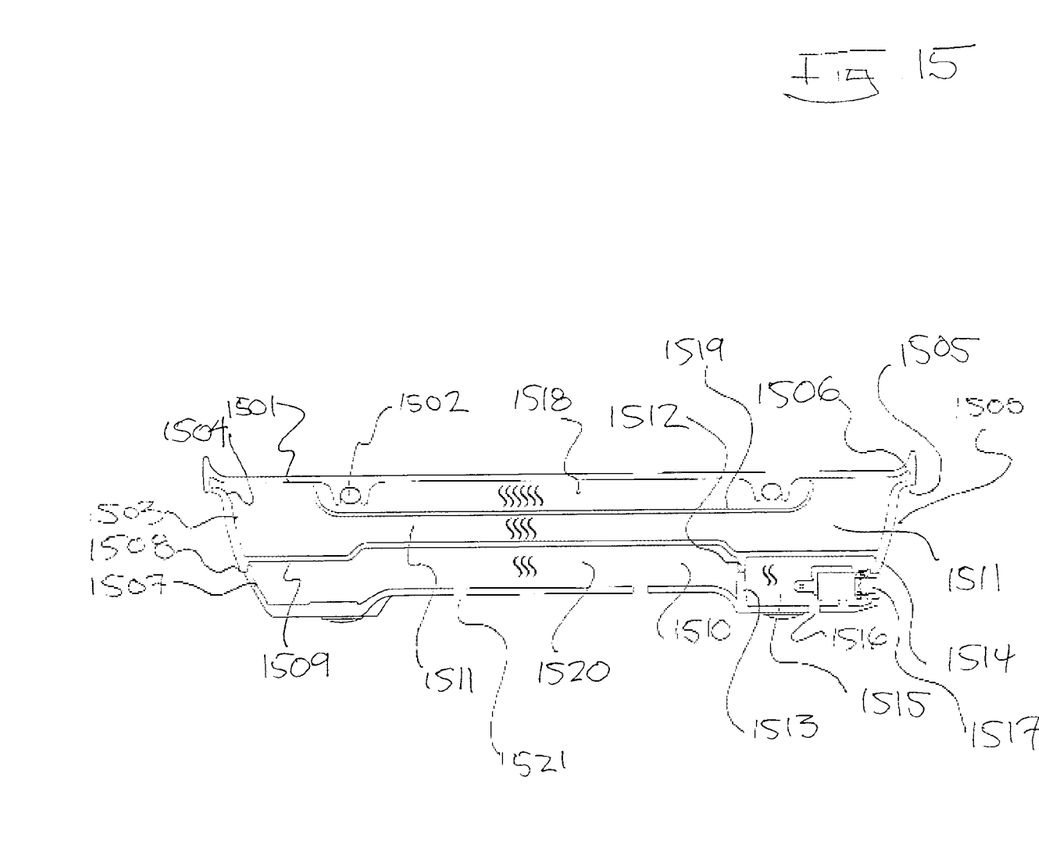
FIG. 15 is a cross-sectional view through a lower housing illustrating the provision of protective compartments.

FIG. 15 illustrates a lower housing 1500 within which are located multiple compartments. In this example, the lower cooking plate 1501 and its heating elements 1502 are supported peripherally by an upper part 1503 of the lower housing 1500. The upper part 1503 has an outwardly turned, peripheral upper rim or lip 1504 that defines a gap 1505 between the lip 1504 and the rim 1506 of the lower cooking plate. The gap 1505 forms a vent around the perimeter of the upper part and allows hot air to escape. The upper part 1503 may be tapered toward the rim of contact 1508 with the separately formed lower part. The upper part 1503 preferably has a continuous or practically continuous lower floor 1509. The floor 1509 of the upper compartment 1503 isolates and protects the contents of a lower compartment 1510 from an upper compartment 1511 which is closer to the heating elements 1502. A downward facing rib 1512 formed on an underside of the upper part's floor 1509 can cooperate with an upward facing rib 1513 formed on an upper surface of the lower part 1507. These ribs 1512, 1513 coincide to form a third or further compartment 1515. In this example, an isolated power switch compartment 1515 is formed. The compartment may contain one or more vents 1516, particularly on lower or floor surface. The compartment 1515 is adapted to contain a power switch 1517. Within the lower housing, the hottest air is to be found in the area 1518, below the cooking plate and above a protective shield 1519. Air in the remainder of the first compartment 1511 is not as hot. Air in the second compartment 1520 is generally cooler than air in the first compartment. The second compartment 1520 may be provided with vents 1521 through its floor. Air in the third compartment 1515 is cooler than air in the second compartment 1520.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. A cooking appliance comprising:
    an upper housing assembly;
    a lower housing assembly; and
    a hinge assembly coupling the housing assemblies for angular movement about a generally horizontal axis, the angular movement providing for movement the upper housing assembly between a first position at which the housing assemblies are adjacent and a second position at which the upper housing is spaced upwardly from the first position, providing for the location of a food product between the housing assemblies for the purposes of cooking the food product, the hinge assembly including,
    a hollow portion attached to a first one of the housing assemblies and through which the axis passes,
    a hollow housing located within the hollow portion and through which the axis passes,
    a spring located in the hollow housing,
    a part attached to a second one of the housing assemblies and through which the axis passes, and wherein the spring is operatively associated with the hollow portion and the part to urge the upper housing to the second position thereof; and
    the hollow housing includes a sleeve, a post located in the sleeve so that there is a cavity between the post and sleeve, with the spring being located in the cavity.

2. The cooking appliance of claim 1, wherein the spring has a first end portion engaged with the hollow housing, and a second end portion engaged with the part, with the hollow housing being fixed to the first hinge assembly so that there is no relative movement between the hollow housing and first hinge assembly.

3. The cooking appliance of claim 1, wherein the spring is a coil spring through which the axis passes, so that coils of the spring surround said axis.

4. The cooking appliance of claim 1, wherein the sleeve has a plurality of ribs and/or grooves, and the hollow portion a plurality of ribs and/or grooves that are engaged with the ribs and/or grooves of the hollow housing so that the hollow housing is engaged with the hollow portion to prevent relative movement therebetween.

5. The cooking appliance of claim 1, wherein said spring applies a torque urging the first housing assembly to the second position.

6. The cooking appliance of claim 5, wherein said spring is configured so that the torque applied diminishes as the first housing assembly moves from the first position towards the second position.

7. The cooking appliance of claim 1, wherein the first housing assembly is the upper housing assembly, and the second housing assembly the lower housing assembly.

8. The cooking appliance of claim 2, wherein the spring is a coil spring through which the axis passes, so that coils of the spring surround said axis.

9. The cooking appliance of claim 2, wherein the hollow housing includes a collar engaged with the hollow portion and the part to sealingly connect the hollow portion with the part.

10. The cooking appliance of claim 3, wherein the hollow housing includes a collar engaged with the hollow portion and the part to sealingly connect the hollow portion with the part.

11. The cooking appliance of claim 4, wherein the hollow housing includes a collar engaged with the hollow portion and the part to sealingly connect the hollow portion with the part.

12. The cooking appliance of claim 1, further including an anti-friction sleeve disposed between the post and an inside diameter of the spring.

13. A cooking appliance comprising:
    an upper housing assembly;
    a lower housing assembly; and
    a hinge assembly coupling the housing assemblies for angular movement about a generally horizontal axis, the angular movement providing for movement the upper housing assembly between a first position at which the housing assemblies are adjacent and a second position at which the upper housing is spaced upwardly from the first position, providing for the location of a food product between the housing assemblies for the purposes of cooking the food product, the hinge assembly including,
    a hollow portion attached to a first one of the housing assemblies and through which the axis passes,
    a hollow housing located within the hollow portion and through which the axis passes,
    a spring located in the hollow housing,
    a part attached to a second one of the housing assemblies and through which the axis passes, and wherein the spring is operatively associated with the hollow portion and the part to urge the upper housing to the second position thereof; and
    wherein the hollow housing includes a collar engaged with the hollow portion and the part to sealingly connect the hollow portion with the part.

14. The cooking appliance of claim 13, wherein the part slidably engages the collar.

15. A cooking appliance comprising:
    an upper housing assembly;
    a lower housing assembly; and
    a hinge assembly coupling the housing assemblies for angular movement about a generally horizontal axis, the angular movement providing for movement the upper housing assembly between a first position at which the housing assemblies are adjacent and a second position at which the upper housing is spaced upwardly from the first position, providing for the location of a food product between the housing assemblies for the purposes of cooking the food product, the hinge assembly including:
    a hollow portion attached to a first one of the housing assemblies and through which the axis passes,
    a hollow housing located within the hollow portion and through which the axis passes,
    a spring located in the hollow housing,
    a part attached to a second one of the housing assemblies and through which the axis passes, and wherein the spring is operatively associated with the hollow portion and the part to urge the upper housing to the second position thereof; and wherein the hinge assembly includes a further sleeve, the further sleeve being located between the spring and the housing sleeve.

* * * * *